United States Patent

Lesniewski

[15] 3,702,463

[45] Nov. 7, 1972

[54] DATA PROCESSOR WITH CONDITIONALLY SUPPLIED CLOCK SIGNALS

[72] Inventor: Robert J. Lesniewski, Lansdale, Pa.

[73] Assignee: The United States of America as represented by the Administrator of the National Aeronautics and Space Administration

[22] Filed: Dec. 23, 1970

[21] Appl. No.: 100,996

[52] U.S. Cl. ....................340/172.5

[51] Int. Cl. ....................G06f 9/00

[58] Field of Search ................340/172.5; 328/63, 72

[56] References Cited

UNITED STATES PATENTS

| | | | |
|---|---|---|---|
| 3,350,692 | 10/1967 | Cagle et al. | 340/172.5 |
| 3,245,048 | 4/1966 | Carter et al. | 340/172.5 |
| 3,274,556 | 9/1966 | Paul et al. | 340/172.5 |

*Primary Examiner*—Paul J. Henon
*Assistant Examiner*—Sydney R. Chirlin
*Attorney*—R. F. Kempf, E. Levy and G. T. McCoy

[57] ABSTRACT

A digital data processor wherein operations are performed in response to a pulse from a clock source includes means for deriving binary signals indicative of the state of various indicators within the processor. One of the indicator signals is selectively fed through a first switch having a single output lead. The indicator output signal is fed to a second switch responsive to a command signal source and pulses from a clock source. In response to one component of the command signal source having a predetermined value, pulses from the clock source are invariably fed through the second switch. In response to the other state of the one component, pulses from the clock source are selectively gated through the second switch, depending upon the relative values of binary signals derived from the first named switch and a second component of the command signal source.

12 Claims, 3 Drawing Figures

INVENTOR,
ROBERT J. LESNIEWSKI
BY
Earl Levy
ATTORNEYS

INVENTOR,
ROBERT J. LESNIEWSKI

BY

Carl Levy

ATTORNEYS

DATA PROCESSOR WITH CONDITIONALLY SUPPLIED CLOCK SIGNALS

The invention described herein was made by an employee of the United States Government and may be manufactured and used by or for the Government for governmental purposes without the payment of any royalties thereon or therefor.

The present invention relates generally to digital data processing apparatus, and more particularly, to a digital data processor wherein clock pulses are gated to the processor either invariably, or selectively, depending upon the relative value of signals commensurate with indications of the state of the processor and a command signal source.

In many digital computer and data processing systems, data are represented by binary bits stored in register stages. The binary bits are transferred between register stages and other components in response to pulses from a clock source being fed to the data processing system. Operations within the digital data processor are performed depending upon indications of the state of binary signals in the various registers. In most data processors, it is necessary to employ a separate signal carrying lead or line for each binary signal indication that might be utilized to control the application of clock pulses to the data processor and operations therein. In integrated circuit technology, and in particular in large scale integrated networks, the use of plural lines can be highly disadvantageous. Multiple lines result in fabrication problems and can cause an expansion of space and power requirements of large scale integrated circuit networks.

In accordance with the present invention, clock pulses are conditionally supplied to a digital processing unit in response to the relative values of a binary bit of a control source and a binary bit derived on a single lead. The binary bit on the single lead is indicative of the state of a selected indicator for the digital processing unit. The clock pulses may also be invariably or unconditionally fed to the unit, regardless of the relative values of the binary indicator signal and the command bit.

Because a single line carries the binary indicating signals, a multiplicity of digital processing units may be conditionally controlled in the same data system. In prior art systems, it was generally the practice to employ a multiplicity of additional logic elements or lines to interconnect a multiplicity of simultaneously operating digital units. The present invention finds particular utility in applications relating to shifting data within a register or between several registers, as is frequently required in multiplication operations.

It is, accordingly, an object of the present invention to provide a new and improved digital data processor wherein operations are performed conditionally depending upon the state of indicators within the processor.

Another object of the invention is to provide a digital data processor wherein operations are performed in response to a clock pulse and the clock pulse is either unconditionally coupled to the unit or conditionally coupled to the unit depending upon the relative values of a selected indicator of the state of the processor and a command signal component.

Another object of the present invention is to provide a new and improved system wherein operations may be conditionally performed depending upon the status of one of a plurality of indicators within the unit and a single lead is employed for gating an indicator signal to a logic element for selectively feeding activating pulses to the unit.

Still another object of the invention is provide a new and improved system wherein a multiplicity of digital data processing units are interconnected with each other and indications from one unit are gated to a single lead to enable operations within a plurality of other units to be performed.

The above and still further objects, features and advantages of the present invention will become apparent upon consideration of the following detailed description of one specific embodiment thereof, especially when taken in conjunction with the accompanying drawings, wherein:

Figure 1:
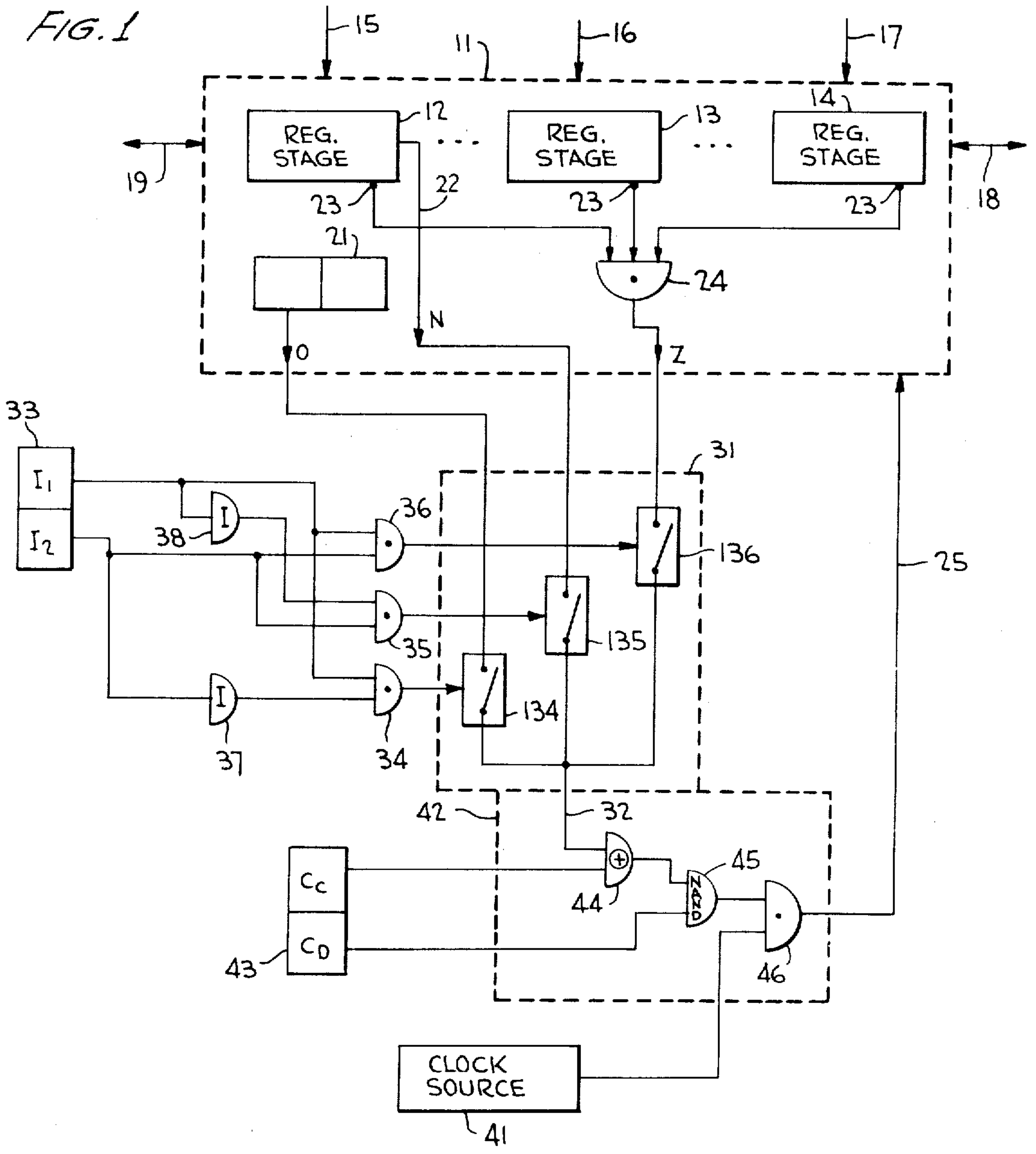
FIG. 1 is a block diagram of a preferred embodiment of the present invention utilized in conjunction with a system of the type disclosed in Lesniewski patent application, Ser. No. 713,188; filed Mar. 14, 1968 now U.S. Pat. No. 3,688,483.

Reference is now made to FIG. 1 of the drawings wherein there is illustrated a digital processing unit 11, preferably of the type described in the aforementioned, copending Lesniewski application. Basically, unit 11 includes a plurality of separate register stages 12, 13 and 14, each separately responsive to parallel data lines 15, 16 and 17, respectively. The least significant bit register stage 14 is selectively coupled with right data line 18, while most significant bit register stage 12 is selectively connected with left data line 19. As described in the copending Lesniewski application, register stages 12–14 are selectively connected with each other and data lines 15–19 to perform shift operations between the register stages in either direction, as well as to rotate bits between the register stages in a righthand direction so that the output of stage 14 is connected to the input of stage 12. Also, signals stored in register stages 12–14 can be added to or subtracted from signals on data lines 15–17 and signals stored in register stages 12–14 can be incremented or decremented in response to clock pulses applied to unit 11. Further, unit 11 can be activated so that each of stages 12–14 is simultaneously set to a binary one state or to a binary zero state. One further capability of unit 11, as disclosed in the copending Lesniewski application, concerns combining the signals on data lines 15–17 with those in register stages 12–14 in accordance with the logical operations EXCLUSIVE OR, AND, as well as OR.

As disclosed in the copending Lesniewski application, register stages 12–14 are interconnected with each other and left and right lines 18 and 19 in accordance with four different modes, denominated as modes zero, 1, 2 and 3. In mode zero, data can be coupled in either direction between most significant bit register stage 12 and lefthand data lead 19, as well as between least significant bit register stage 14 and righthand data lead 18. In mode 1, signals on lead 18 can be coupled in either direction between register stage 12 and lead 19, but register stage 14 cannot be coupled with righthand lead 18. In mode 2, data can be fed in either direction between register stage 14 and lead 18, but register stage 12 is decoupled from lead 19. In mode 3, lines 18 and 19 are interconnected with each other and no connections are made between the register stages and the left and right lines.

Data stored in most significant bit register stage 12 are utilized to indicate the polarity of a binary word stored in the remainder of the register stages, and indicative of a numerical value. A binary one signal stored in register stage 12 indicates a negative number stored in the remainder of the register stages, while a binary zero signal in register stage 12 is commensurate with a positive number stored in the remainder of the register stages. The binary one, negative indicating signal is coupled from register stage 12 to output lead 22 in response to a clock pulse signal being supplied to unit 11.

In response to the signals on parallel input leads 15-17 being combined with the signals stored in register stages 12–14 an overflow can occur when the system is operating in two's complement logic. A two's complement overflow occurs in response to the polarity or sign of a binary word on lead 15–17 being the same as the polarity of the word in register stages 12–14 and the resultant of an addition operation of the two words having a different polarity. As described in the copending Lesniewski application, overflows are detected with a logic network and stored in a bi-stable flip-flop, shown by reference numeral 21 in FIG. 1 and illustrated in FIG. 6 of the copending Lesniewski application as flip-flop 147.

A further useful indication regarding the state of register stages 12–14 within unit 11 concerns detecting a zero in each of the stages. Each of register stages 12–14 includes an inverse or complementary output terminal 23 for deriving a binary signal having a polarity opposite to that of the signal stored in the register stage. The signals on leads 23 are combined in AND network 24 which derives a binary one output signal in response to a binary zero being stored in and read from each of register stages 12–14 in response to positive going transitions of pulses from a clock source coupled to unit 11 on lead 25.

The operations in unit 11 involving combining the signals on leads 15–17 with signals in register stages 12–14, shifting signals between the register stages and to right and left lines 18 and 19 are performed in response to the leading edge, i.e., the positive going edge, of pulses fed by a clock source pulse to unit 11 on lead 25. Between occurrences of the leading edges of each clock pulse, no signals are circulated between register stages 12–14, the register stages are static and are decoupled from signals on leads 15–19.

Up to the present, the description of unit 11 has been concerned only with the prior art, as disclosed in the Lesniewski patent. In accordance with the present invention, the binary state indicating signals derived from flip-flop 21, AND gate 24 and on lead 22, are selectively gated by switch network 31 to output lead 32. Switch network 31 responds to the indicator output signals of unit 11 so that the value of only one of the indicator signals is coupled at a time to output lead 32, or none of the indicator signals is fed to lead 32. Selection of the desired indicator signal coupled from unit 11 through switch network 31 to output lead 32 is in response to a first binary command signal source 33, including a binary word having two bits $I_1$ and $I_2$.

The two-bit binary word in source 33 is capable of assuming four bit combinations, namely 00, 01, 10 and 11. For the bit combination 00, none of the indicator output signals of unit 11 are coupled through switch network 31 to lead 32; for the combination 01, the state of overflow flip-flop 21 is coupled to output lead 32 via switch 134; for the combination 10, the negative indicating signal coupled by register stage 12 to lead 22 is gated to output lead 32 via switch 135; and for the combination 11, the all zero indication of registers 12-14 is gated from the output of AND gate 24 to output lead 32 via switch 136. Each of switches 134–136 is preferably the source drain path of a MOSFET having a gate electrode controlled by a control signal, although it is to be understood that any switching device that selectively forms open and short circuits between a signal source and output lead 32 can be used. An important feature in using switching devices is that any number of signal leads can be selectively connected to lead 32 without affecting any of the signal driving sources.

The control circuit responsive to source 33 for controlling switches 134–136 within network 134 includes three AND gates 34, 35 and 36, respectively supplying control signals to switches 134, 135 and 136. AND gate 34 is enabled in response to the code 01 by having one input directly responsive to the $I_1$ bit of command source 33 and the complement, $\overline{I}_2$, of the second bit of command source 33, as coupled through inverter 37. AND gate 35 is enabled in response to command source 33 storing the binary bits 10 by virtue of the connection of one input of the AND gate directly to the $I_2$ bit of the command source and the connection of a second input terminal to the $I_1$ bit of the command source via inverter 38. AND gate 36 is enabled in response to $I_1 = I_2 = 1$ by virtue of direct connections between the two bits of the command source to a pair of inputs of the AND gate. Switches 134-136 are respectively open and short circuited in response to binary zero and one signals being derived by AND gates 34–36.

As mentioned supra, operations in unit 11 occur in response to the leading or positive going edge of clock pulses fed to the unit via lead 25. Clock pulses are selectively applied to lead 25 from clock pulse oscillator source 41, selectively connected to lead 25 through logic circuit 42. Logic circuit 42 is also responsive to a second two-bit command signal source 43. Depending upon the binary state of the first and second bits $C_C$ and $C_D$ of source 43, pulses from clock source 41 are selectively gated through logic circuit 42 to lead 25. In response to the second bit, $C_D$, of source 43 being a binary zero, pulses from source 41 are gated through logic circuit 42 regardless of the state of binary signals on lead 32, i.e., with the value of $C_D$ being equal to a binary zero clock source 41 is unconditionally coupled to lead 25 to cause operations to be performed in unit 11. In contrast, however, in response to the value of $C_D$ being a binary one, pulses from source 41 are gated through logic circuit 42 depending upon the relative values of the first bit, $C_C$, of the word stored in source 43 and the signal on lead 32. In response to the binary signal on lead 32 being different from the binary state of bit $C_C$, pulses from clock source 41 are decoupled from lead 25 and unit 11 cannot be activated to perform any operations, provided $C_D$ equals a binary one value. In contrast, with $C_D = 1$ and the binary values of $C_C$ and the signal, $I_0$, on lead 32, being the same, pulses from clock source 41 are fed through logic circuit 42 to lead 25.

To perform the operations stated supra, logic circuit 42 includes an EXCLUSIVE OR gate 44 responsive to the signal on lead 32, $I_0$, and the first bit, $C_C$, derived from command source 43. In response to the values of $I_0$ and $C_C$ being different, EXCLUSIVE OR gate 44 derives a binary one signal, but a binary zero signal is derived from the gate 44 in response to $C_C$ and $I_0$ having the same value. The output signal of EXCLUSIVE OR gate 44 is fed to one input of NAND gate 45, having a second input responsive to the $C_D$ bit of source 43. In response to both inputs to NAND gate 45 having a binary one level, the NAND gate derives a binary zero output signal. In response to all other combinations of the output of EXCLUSIVE OR gate 44 and the values $C_D$, a binary one output is derived from NAND gate 45. The output of NAND gate 45 is fed to AND gate 46, also responsive to clock source 41. In a manner well known to those skilled in the art, AND gate 46 responds to the indicator signal on lead 32 and the two bits of command source 43 selectively to gate clock source 41 to lead 25 in accordance with:

TABLE I

| $C_D$ | $C_C$ | $I_0$ | Effect on Pulses From 41 |
|---|---|---|---|
| 0 | 0 | 0 | Gated through 42 |
| 0 | 0 | 1 | Gated through 42 |
| 0 | 1 | 0 | Gated through 42 |
| 0 | 1 | 1 | Gated through 42 |
| 1 | 0 | 0 | Gated through 42 |
| 1 | 0 | 1 | Blocked by 42 |
| 1 | 1 | 0 | Blocked by 42 |
| 1 | 1 | 1 | Gated through 42 |

In the system of FIG. 1, a single lead 32 is selectively responsive to one of a plurality of indicator signals derived from unit 11. The signal on the single lead 32 is combined with a command signal from source 43 to gate pulses selectively from clock source 41 through logic circuit 42 to lead 25. By utilizing a single lead 32 for carrying the indicator signals and a single lead 25 for selectively coupling signals from clock source 41 into processor unit 11, the system is easily adapted to large scale integrated circuit techniques to provide an extremely large number of possible circuit combinations. Of course, in integrated circuits, and particularly in large scale integrated circuit configurations, the desirability of minimizing leads is paramount.

Figure 2:
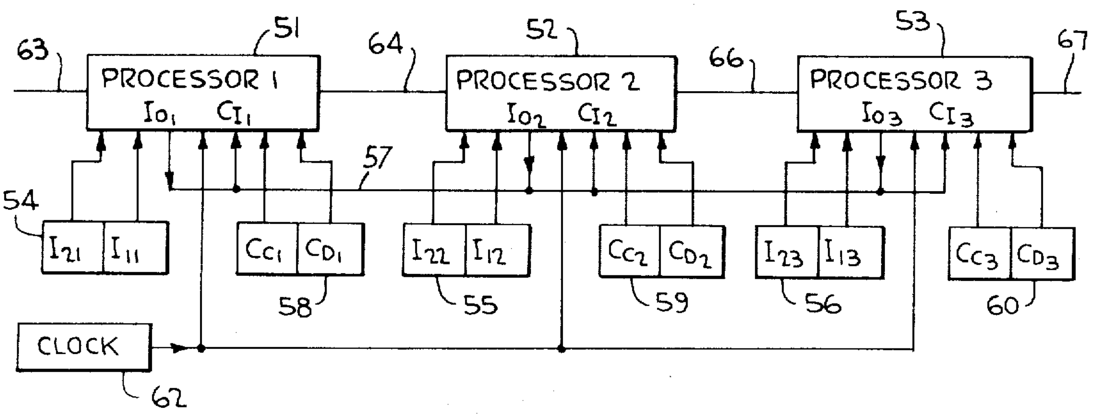
FIG. 2 is a block diagram illustrating the manner by which a plurality of systems of the type illustrated by FIG. 1 are interconnected.

Reference is now made to FIG. 2 of the drawings wherein a block diagram of a system employing a plurality of processing units is illustrated. In FIG. 2, three processors 51, 52 and 53 are interconnected with each other. Each of processors 51–53 includes a multiplicity of register stages, such as are included in unit 11 of FIG. 1. In addition, each of the processors 51–53 includes a switch 31 for enabling a binary output signal indicative of the state of a selected indicator within the unit 11 of the processor to be gated to an output. The indicator signals derived from processors 51, 52 and 53 are respectively denominated as $I_{0_1}$, $I_{0_2}$ and $I_{0_3}$. Each of processors 51, 52 and 53 is respectively responsive to different two-bit command signal source 54, 55 and 56 for controlling which of the indicator signals derived from the processors is to be coupled to the leads $I_{0_1}$, $I_{0_2}$ and $I_{0_3}$. The bits of the signals of sources 54–56 are for the general situation represented by:

$$I_{mn},$$

where:

- $m$ indicates the number of the bit, and
- $n$ equals the number of the processor (processors 51–53 are respectively indicated as processors 1, 2 and 3 in this nomenclature).

For example, bit two of command source 55 feeding processor 52 is indicated as $I_{22}$.

Each of processors 51–53 also includes a switch 42 with inputs denominated as $C_{I_1}$, $C_{I_2}$ and $C_{I_3}$, respectively. The $C_{I_1}$, $C_{I_2}$ and $C_{I_3}$ inputs to logic circuit 42 of the processors 51–53 are tied to a common buss 57, responsive to the $I_{0_1}$, $I_{0_2}$ and $I_{0_3}$ output signals of 51–53.

Each of the logic circuits 42 included in processors 51, 52 and 53 is respectively responsive to a different two-bit command signal source 58, 59 and 60. The command signal sources 58–60 control the state of each of logic circuits 42 within the several processors 51–53 to selectively gate signals from clock source 62 into the three processors. Gating of signals from source 62 into processors depends upon the binary values of bits $C_{D_1}$, $C_{D_2}$ and $C_{D_3}$, as well as upon the relative values of the signals on leads 57 and the first bit $C_{C_1}$, $C_{C_2}$ and $C_{C_3}$ of each of sources 58–60.

With the system of FIG. 2, a single buss 57 selectively couples indicator signals between the three processors 51–53 to control the transfer of information within and between the processors. Further, the control of information within and between various processors via leads 63–66 is in response to signals selectively coupled by clock source 62 to the different processors, depending upon the mode in which the processor is activated. It is to be noted that signals are coupled to lead 57 from only one processor at a time in order to provide an operative system.

One use of the system of FIG. 2 can be appreciated by considering a situation wherein it is desired to shift a signal stored in processor 53 to the left a predetermined number of times. In the prior art, to shift a signal in processor 53 to the left five times, five separate shift instructions were required. In accordance with the present invention, it is necessary to include only one shift instruction and to load a counter, in the form of processor 52, with a number indicative of the appropriate number of shifts. Processor 51 is employed in the system as a program counter for reading data words from a memory source, not shown, to processors 52 and 53, and to feed instruction words from the memory to command signal sources 54–56 and 58–60. From the memory source, data words are coupled to parallel input lines of processor 52, which in turn feed the different register stages of processor 52 with bits indicative of the number of shifts to be performed. For example, if the number of shifts is five, the first and third stages of register 52 are loaded with binary ones and all remaining stages are loaded with binary zeros. The word to be shifted to the left a predetermined number of times is fed from the memory to the register stages of processor 53 via the parallel input lines connected to the different stages of processor 53.

To perform the shift left operation, the program counter comprising processor 51 is fed by command source 54 with a binary signal having bits commensurate with $I_{11} = 0$ and $I_{21} = 0$, whereby the indicator output signal $I_{0_1}$ of processor 51 is always a binary zero level. Similarly, the binary signal fed by the $I_{0_3}$ output of processor 53 is always a binary zero by establishing $I_{23} = 0$ and $I_{13} = 0$. In contrast, the zero condition of processor 52 is gated to buss 57 during the entire shift left operation by setting $I_{12} = 1$ and $I_{22} = 0$.

To permit proper operation of processors 51, 52 and 53 during the shift left operation, the bits of source 58, $C_{C_1}$ and $C_{D_1}$, are both set to a binary one state enabling program counter 51 to execute a command in response to positive going transitions of clock source 62 while a binary one signal is derived on lead 57, which can occur only in response to all of the registers of processor 52 storing a binary zero signal. Processor 52 is activated in response to each positive transition of clock source 62 for only the five shift operations by virtue of the bits of source 59 having values indicated by $C_{C_2}=0$ and $C_{D_2}=1$. The bits of signal source 60 feeding processor 53 are set to the same values as the corresponding bits of source 59, whereby processor 53 is stepped only as long as a finite, non-zero condition exists in all of the register stages of processor 52.

In the described example concerning FIG. 2, processor 53 is activated to mode 1 so that signals shifted between the register stages are fed to lead 66 during each left shift operation. Simultaneously, processor 52 is energized to mode 3, whereby leads 64 and 66 are decoupled from the processor, which is encoded to shift data in the right direction. During this operation, program counting processor 51 is activated to a state whereby an appropriate address in memory loads: (1) the correct command signal words into processors 51–53; and (2) the correct mode and instruction words into processors 52 and 53. After the shift left operation has been completed, processor 51 is incremented by a count of one and stores a new command address for the memory to load another set of instructions into processors 51–53 and data into processors 52 and 53.

To summarize the operations performed during a shift left sequence, again assume that processor 52 is storing a count indicative of five, as represented by the binary word "one zero one" stored in the three least significant stages thereof. Also assume, for the purposes of the example, that the processor 53 includes only three register stages, each containing a binary one bit, whereby processor 53 stores the bits one, one, one in the three stages thereof. In response to the first positive going transition of clock source 62 under the assumed conditions, processor 52 is activated so that the three least significant stages thereof are activated to store the binary equivalent of four, 101. While processor 52 is being activated so that the number stored therein is transferred from 101 to 100, processor 53 is energized to shift the signals stored therein to the left so that the three stages thereof are activated from 111 to 110.

In response to the next or second clock pulse from source 62, processor 52 is activated so that the binary word stored therein equals 011, and simultaneously processor 53 is energized so that the three stages thereof store the bits 100. In response to the next or third positive going transition of pulse source 62 the count stored in processor 52 is decremented further to the count 010, and processor 53 is again shifted to the left so that a binary zero is stored in each stage thereof. In response to the fourth positive going transition of clock source 62, processor 52 is again decremented to store the count 001, and each of the three stages of processor 53 continues to store a binary zero count. In response to the fifth positive going pulse derived from clock source 62, processor 52 is again decremented, so that it stores a zero indication and processor 53 is static. The zero indication stored in processor 52 is not, however, read out until the sixth clock pulse from source 62 is derived.

In response to the sixth clock pulse from source 62, a binary zero indication of processor 52 is coupled to buss 57 by the $I_{0_2}$ output of processor 52 as a binary one signal. The binary one signal on buss 57 is coupled to the $C_{I_1}$ input of processor 51 to advance the program counter processor 51, to the next memory address in response to the positive transition of the pulse generated by clock source 62. The positive transition of clock source 62 is, however, decoupled from processors 52 and 53 at this time because command sources 59 and 60 are energized so that $C_{C_2}=C_{C_3}=0$ and $C_{D_2}=C_{D_3}=1$.

An example of a further operation which is performed with the conditional transfer logic of the present invention involves shifting the count in a register to the left and simultaneously counting. This operation is of particular interest with regard to binary logarithmic compression wherein the position of a one in the most significant bit position of a binary word is to be determined. For example, a 16 bit word can be compressed to a word having a total of 8 bits, four of which are utilized to represent an exponent, and the remaining four are employed to represent the four most significant bits of data, excluding the most significant bit for representing the polarity of the word. In the described example, processor 51 is again employed as a program counter, processor 52 is also utilized as a counter for indicating the number of the operation within a particular subroutine and processor 53, now assumed to include 16 stages, is loaded with a word to be compressed. The word to be compressed is shifted to the left in processor 53 one place if the negative indicator thereof is not true, i.e., a binary zero is stored in the most significant bit stage of processor 53. Program counting processor 51 is incremented by one in response to a negative condition existing in the word stored in processor 53, as indicated by the most significant bit position of the word in processor 53 having a binary one value. Processor 52 is continuously decremented in response to each positive going transition of source 62 until a negative number is stored in processor 53. The conditions for shift left and count are established by setting $I_{21}=I_{11}=0$ so that the $I_{0_1}$ output of processor 51 is decoupled from buss 57. The $I_{12}$ and $I_{22}$ inputs to processor 52 are set equal to 1 and 0, respectively, so that the $I_{0_2}$ output of processor 52 is indicative of the zero condition indicating signal derived from processor 52. Processor 53 is fed by signal source 56 with the signals $I_{23}=1$ and $I_{23}=0$ so that the $I_{0_3}$ output of the processor is responsive to the most significant bit stage of processor 53.

To control gating of clock source 62 into processor 51, bits $C_{C_1}$ and $C_{D_1}$ of source 58 are both set equal to one so that program counter 51 is incremented only in response to a binary one occurring on lead 57 while a positive going transition of clock source 62 occurs. A binary one is coupled to buss 57 while the shift left and add sequence is being performed only in response to a binary one being read from the most significant bit stage of processor 53 to indicate a negative number in processor 53. During the shift left and count sequence, bits $C_{C_2}=0$ and $C_{D_2}=1$, so that processor 52 is decremented by a count of one in response to each positive going transition of clock source 62 until a binary one signal is stored in the most significant bit stage of processor 53 to indicate that the processor is storing a negative number. During the sequence being considered, the values of $C_{C_3}=0$ and $C_{D_3}=1$, whereby processor 53 is shifted until a negative number is stored therein, as indicated by a binary one in the most significant bit stage thereof, as coupled to buss 57 via signal terminal $I_{0_3}$.

From the foregoing pair of examples, it is seen that a system of the type illustrated by FIG. 2 is capable of performing many functions with a minimum of hardware and a small number of steps. Such a system is particularly adapted for multiplying two 16 bit words by each other, if three processors 51–53, each including 16 register stages, are provided. In such an example, first and second adjacent processors together form one 32 bit register and a third processor forms an independent 16 bit register. The most significant bit stage of the first processor is connected via a lead to the least significant bit stage of the second processor through appropriate modal connections. The stages of the sixteen bit register are however, decoupled from all the stages of the 32 bit register. A further processor is employed as a decrementing counter for storing the count within the multiplication sequence. For a complete description of a complete program for a multiplication operation involving two 16 bit words, reference should be made to the masters thesis of Robert J. Lesniewski, submitted to the faculty of the graduate school of the University of Maryland, 1970. Since the basic apparatus employed to perform the multiplication operation is substantially the same as illustrated in FIG. 2, but the sequence is relatively complex, no detailed description of the sequence is given.

Figure 3:
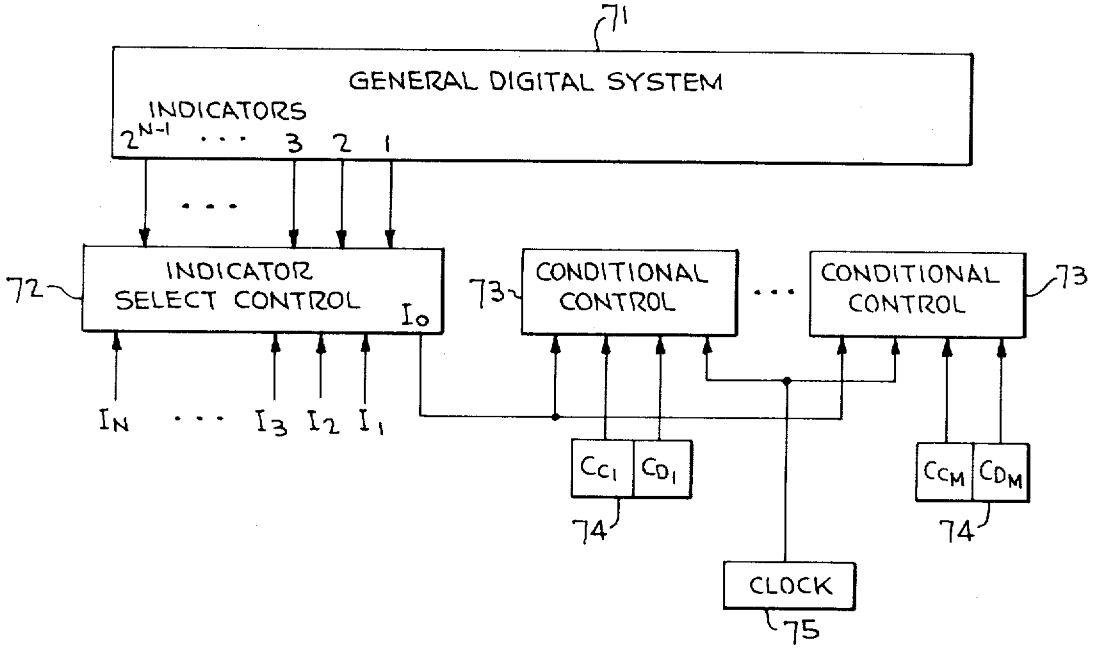
FIG. 3 is a block diagram of a general digital system functioning in accordance with the present invention.

Reference is now made to FIG. 3 of the drawings wherein there is illustrated how the teachings of the present invention can be expanded to a general digital system of the binary type wherein data are transferred and operated with each other in response to clock pulse transitions. The general digital system 71 of FIG. 3 includes a multiplicity, $2^{N-1}$, of binary indicator signals; in the system of FIG. 1, there are three indicators, whereby = 2. The $2^{N-1}$ binary indicator signals derived from system 71 are fed to indicator select control system 72, responsive to a command word having N binary bits, denominated as $I_1, I_2, I_3 \ldots I_N$. Indicator select control network 72 responds to the $I_N$ bit word fed thereto to select one of the $2^{N-1}$ indicators derived from system 71.

The selected indicator signal is fed to the $I_0$ output of control network 72 and is coupled to M conditional control gating networks 73. Each of conditional control networks is responsive to transitions of clock source 75 and a different two bit word source 74, having bits respectively denominated as $C_{C_M}$ and $C_{D_M}$. In the system of FIG. 2, there are three conditional control networks, each being responsive to a separate two-bit binary word, whereby $M=3$.

In the system of FIG. 3, it is noted that a single buss is utilized to feed an indicator select control signal to a plurality of networks responsive to a clock source to control the transfer of data in general digital system 71.

The system of FIG. 3 can be expanded to include a plurality of general digital systems in parallel. In such a system, the output of the indicator select control network 72 associated with each of the general digital system has a common conditional line feeding a plurality of conditional control networks, each of which supplies a signal to a different general digital system. With such a system, the single buss is capable of establishing conditional operations based upon the response of one of a multiplicity of general digital systems.

While there has been described and illustrated one specific embodiment of the invention, it will be clear that variations in details of the embodiment specifically illustrated and described may be made without departing from the true spirit and scope of the invention as defined in the appended claims.

I claim:

1. In a data processor wherein operations are performed in response to a clock signal and at least one binary signal indicative of the state of the processor is derived, the improvement comprising: a first command source, means responsive to the first command source for selectively feeding a binary state indicating signal to a single line, said feeding means including means for enabling only one of the state indicating signals to be fed to the single line at a time, a second command source having first and second signal components, and means responsive to the state indicating signal fed to the line and the second command source for feeding clock signals to the data processor regardless of the binary value of the state indicating signal fed to the line while said first signal component has a first value, or for selectively feeding clock signals to the data processor in response to the relative values of the second signal component and the state indicating signal fed to the line while said first signal component has a second value.

2. The combination of claim 1 wherein $2^{N-1}$ of said binary signals indicative of the state of the processor are derived, wherein N is an integer greater than one, and said first command source includes N binary bits.

3. The combination of claim 1 further including M of said second command sources, M of said means for feeding clock signals, and M means for deriving state indicating signals, wherein M is an integer greater than one.

4. The combination of claim 3 wherein each of said M means deriving state indicating signals includes means for deriving a plurality of state indicating signals.

5. The combination of claim 4 wherein the number of said plurality of state indicating signals equals $2^{N-1}$, and each of said first command source is a binary word having N bits.

6. In a data processor wherein operations are performed in response to a clock signal and at least one binary signal indicative of the state of the processor is derived, the improvement comprising: a first command source, feeding means responsive to the first command source for selectively feeding a binary state indicating signal to a single line, said feeding means including means for enabling only one of the state indicating signals to be fed to the single line at a time, a second command source, and means responsive to the state indicating signal fed to the line and a signal component of the second command source for selectively feeding clock signals to the data processor in responsive to the relative values of the signal component and the state indicating signal fed to the line.

7. The combination of claim 6 wherein $2^{N-1}$ of said binary signals indicative of the state of the processor are derived, wherein N is an integer greater than one, AND said first command source includes N binary bits.

8. The combination of claim 6 further including M of said second command sources, M of said means for feeding clock signals, and M means for deriving state indicating signals, wherein M is an integer greater than one.

9. The combination of claim 8 wherein each of said M means deriving state indicating signals includes means for deriving a plurality of state indicating signals.

10. The combination of claim 9 wherein the number of said plurality of state indicating signals equals $2^{N-1}$, and each of said first command source is a binary word having N bits.

11. A digital processor comprising a processing unit capable of assuming a multiplicity of different states, said unit including: means for deriving a different binary signal indicative of the status of each of said states, and means for enabling a change in the processing unit to occur only in response to an impulse being coupled to an input control terminal thereof; a clock source of said impulses, means for selecting one of said status indicating signals, a command signal source having a binary component, means for comparing the relative values of the selected status indicating signal and the binary component, and means for selectively coupling impulses from said clock source to said terminal in response to the comparison of the relative values of the selected status indicating signal and the binary component.

12. A digital processor comprising a processing unit capable of assuming a multiplicity of different states, said unit including: means for deriving a different binary signal indicative of the status of each of said states, and means for enabling a change in the processing unit to occur only in response to an impulse being coupled to an input control terminal thereof; a clock source of said impulses, means for selecting one of said status indicating signals, a command signal source having first and second binary components, means for comparing the relative values of the selected status indicating signal and the first binary component, and means for selectively coupling impulses from said clock source to said terminal in response to the comparison of the relative values of the selected status indicating signal and the first binary component while the second binary component has a first value or for invariably coupling impulses from said clock source to said terminal while the second binary component has a second value.

* * * * *